Patented Feb. 21, 1950

2,498,533

UNITED STATES PATENT OFFICE 2,498,533

RESINOUS COMPOSITIONS

Ludwig H. Dimpfl, Berkeley, Calif., assignor to California Research Corporation, San Francisco, Calif., a corporation of Delaware No Drawing. Application March 19, 1946,
Serial No. 655,598

9 Claims. (Cl. 260—45.4)

This invention relates to new thermosetting compositions and methods whereby they may be prepared.

More particularly the invention is concerned with the production of compositions that may be cured in a few minutes without a catalyst at temperatures as low as 70–90° C. The chemical reaction whereby these compositions are formed is such that negligible amounts of water or volatile products are liberated during curing. This lends certain advantages for the composition is relatively free from surface crazing, blow-holes, splitting or shrinking during the curing process. The absence of shrinking permits molding to close tolerances.

The polymers comprising this invention may be formed using widely varying proportions of two types of thermoplastic polymers. Type I is the linear condensation polymer of a cyclohexadiene dicarboxylic acid, and Type II is the linear polymer containing an average of more than two activated olefin bonds in the molecule.

It has been discovered that such polymers possess certain properties which render them especially valuable for certain purposes. For example, they possess high water resistance, are insoluble in most organic solvents, light in color, hard, tough and may be varied in mechanical properties in accordance with specific requirements.

The polymers comprising this invention have properties that make them especially useful as components of surface coating materials, adhesives, wood laminates, molded plastics, and the like.

An important feature of the invention is the correlation between the average number of cyclohexadiene nuclei in the Type I polymer molecule with the average number of activated olefin groups in Type II polymer molecule to obtain relatively rapid thermosetting rates. It has been found that where "A" represents the average number of cyclohexadiene dicarboxylic acid residues per molecule in Type I polymer and "B" represents the average number of activated olefin bonds per molecule in Type II polymer the mathematical product of ("A"–2) and ("B"–2) should be at least about 10 to yield measurably accelerated thermosetting rates. It is preferred that the values of "A" and "B" be such that the foregoing mathematical product is greater than about 20 in which case relatively rapid thermosetting rates are obtained at temperatures of 90°–150° C.

The cyclohexadiene dicarboxylic acids from which Type I polymers may be prepared exist in a number of related isomeric forms. The system of nomenclature utilized here for identifying these acids follows the standard system of numbering carbon atoms of the cyclohexadiene ring, as illustrated by the following, wherein the ring carbons are numbered beginning with the first carboxyl group and Δ indicates the positions of the double bonds.

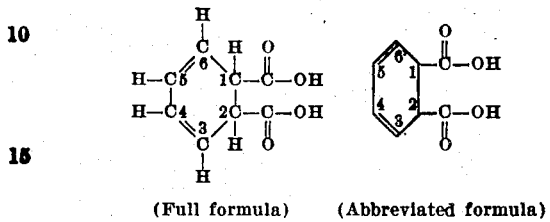

(Full formula)  (Abbreviated formula)

Δ3,5 cyclohexadiene dicarboxylic acid 1,2

TYPE I THERMOPLASTIC POLYMERS

In order to carry out this invention one prepares a member of a first type of long chain polymers formed in the reaction between cyclohexadiene dicarboxylic acid-1,2 and a dibasic alcohol or diamine such as ethylene glycol or ethylene diamine. Such thermoplastic polymers react with one another to form long chains which may be illustrated as follows:

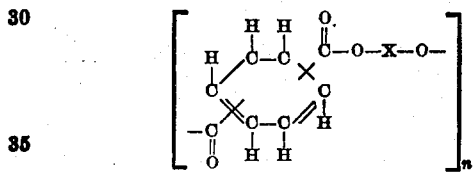

wherein X is a residue of a bifunctional alcohol or amine, i. e., one containing two hydroxy or two amine groups or one amine and one hydroxy group and free from additional hydroxy, amino, carboxylic on diene groups and, wherein the structure in the brackets is repeated $n$ times to form long chain-like structures. (In the event X is an amino alcohol or amine residue one or both oxygens adjacent to X are absent.) A preferred acid, because of the low temperature at which it reacts without a catalyst, of the cyclohexadiene carboxylic acids is the Δ3,5 cyclohexadiene dicarboxylic acid-1,2.

TYPE II THERMOPLASTIC POLYMERS

Additionally, in order to carry out this invention one prepares a second type of linear polymer containing at least two activated olefin bonds per molecule, such as the linear condensation polymer of maleic acid, and a diamine or dihydric alcohol such as ethylene diamine or ethylene glycol. Such linear polymers comprise long chains which may be illustrated as follows:

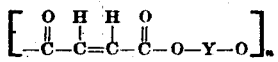

where Y is a residue of a bifunctional alcohol or amine, i. e., one containing two hydroxy or two amine groups or one amine and one hydroxy group and is free from additional hydroxy, amino, carboxylic or diene groups and wherein the structure in the brackets is repeated $n$ times to form long chain-like structures. (In the event Y is an amino-alcohol or amine residue one or both oxygens adjacent to Y are absent.)

It has been discovered that Type I polymers react readily at low temperatures with Type II polymers to form thermoset resins having the unique features already disclosed. The type formula for the resulting resin may be illustrated by the following:

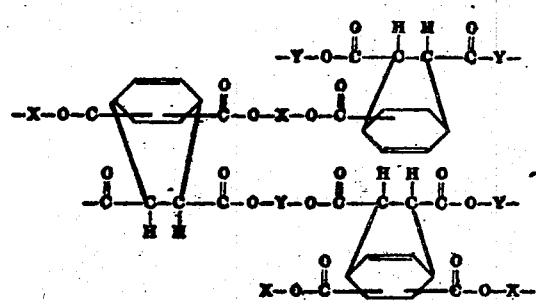

where X and Y are dibasic alcohol or diamine residues as described above.

A member of each of the first and second types of polymers needed to produce the thermosetting polymer may be obtained as outlined in Examples 1 and 2, respectively.

*Example 1.*—A polymeric ester comprising the reaction product of ethylene glycol and trans Δ3,5 cyclohexadiene dicarboxylic acid-1,2 is prepared by adding 168 grams of the acid, 62 grams of ethylene glycol, 330 grams of chlorobenzene and 180 grams of carbon tetrachloride to a 1-liter three-neck flask equipped with a fractionating column, a condenser, a water trap, a drying tube and a dry solvent recycle line. The mixture is quickly brought to the boiling point and boiled for four hours. During this period the temperature rises from 101° to 105° C. and about 30 cc. of water accumulates in the trap. The heating is discontinued and the product is transferred to a flask equipped for stirring under vacuum. The solvent is distilled off at atmospheric pressure until the liquid temperature reaches 140° C. Vacuum is then applied and stirring and heating continued until no more solvent appears to distill off at a liquid temperature of 150° C. and 10 mm. of mercury pressure. The melt is then transferred to a container and allowed to cool. A soft, amber solid is obtained. The value of (A-2) of this product is 5.5.

PREPARATION OF POLYMERS—TYPE II

*Example 2.*—A polymeric ester comprising the reaction product of ethylene glycol and maleic anhydride is prepared by adding 98 grams of maleic anhydride and 62 grams of ethylene glycol in a 500 ml. flask equipped for stirring under vacuum. The temperature is raised to 180° C. in 30 minutes, held at 180° C. and atmospheric pressure for 1 hour and 45 minutes, and finally held at 180° C. and 30–50 mm. of mercury for 30 minutes or until the near-gel stage is reached. The melt is transferred to a flask and gives a transparent water-white plastic solid when cool. The value of (B-2) of this product is 5.0.

The thermoplastic polymers, Type I and Type II, may be used in the form of lumps, powder, granules, solution or a state of fusion. They may be added together in amounts such that the final composition contains Type I polymer in the range of 5 to 95 percent and contains Type II polymer in the range of 5 to 95 percent whereby the sum of Type I and Type II is equal to 100 percent. When mixed in such proportions and given a mild heat treatment a thermoset polymer is obtained having a melt, string and cure time as illustrated in Table 1.

TABLE 1

*Time required for certain esters to melt, string and cure*

| Polyester of ethylene glycol and 3,5 cyclohexadiene dicarboxylic acid, per cent (Type I) | 100 | | 75 | | 50 | | 25 | | 0 | |
|---|---|---|---|---|---|---|---|---|---|---|
| Polyester of ethylene glycol and maleic anhydride, per cent (Type II) | 0 | | 25 | | 50 | | 75 | | 100 | |
| Temp., °C. / Time to— | min. | sec. | min. | sec. | min. | sec. | min. | sec. | min. | sec. |
| 100 Melt | 0 | 20 | 0 | 18 | 0 | 17 | 0 | 18 | | |
| String | 35 | 0 | 26 | 0 | 28 | 0 | 45 | 0 | | |
| Cure | 72 | 0 | 52 | 0 | 51 | 0 | 57 | 0 | No cure | |
| 125 Melt | 0 | 18 | 0 | 18 | 0 | 16 | 0 | 14 | 0 | 10 |
| String | 12 | 0 | 14 | 0 | 16 | 0 | 19 | 0 | >70 | |
| Cure | 33 | 0 | 21 | 0 | 20 | 0 | 24 | 0 | No cure | |
| 150 Melt | 0 | 10 | 0 | 10 | 0 | 8 | 0 | 8 | 0 | 6 |
| String | 11 | 0 | 6 | 0 | 6 | 0 | 6 | 0 | >40 | |
| Cure | 13 | 0 | 7 | 0 | 7 | 0 | 7 | 0 | No cure | |

The data indicate that the curing time is significantly shorter with a mixture of the two types of polymers than with either polymer alone. Furthermore the curing time is appreciably reduced as the temperature is increased. The linear polymers, alone, do not set in the absence of oxygen under the conditions of these tests whereas the mixture thereof sets readily.

The time necessary for a member of each type of linear polymer and for a 50/50 mixture of each type to melt, string or cure at 125° C. in the absence or presence of reducing and oxidizing agents and on a reducing or non-reducing surface is shown in Table 2.

TABLE 2

*Effect of various additives on stroke cure of polyesters at 125° C.*

| Surface | Additive | Concentration | 100% Polyester of ethylene glycol and trans Δ3,5 cyclohexadiene dicarboxylic acid-1,2 | | | | | | 50/50 Mixture of the polyesters of ethylene glycol and trans Δ3,5 cyclohexadiene dicarboxylic acid-1,2 and the polyesters of ethylene glycol and maleic anhydride | | | | | |
|---|---|---|---|---|---|---|---|---|---|---|---|---|---|---|
| | | | Time to— | | | | | | Time to— | | | | | |
| | | | Melt | | String | | Cure | | Melt | | String | | Cure | |
| | | | min. | sec. | min. | sec. | min. | sec. | min. | sec. | min. | sec. | min. | sec. |
| Steel | None | | 0 | 18 | 12 | 0 | 33 | 0 | 0 | 16 | 16 | 0 | 20 | 0 |
| Glass | ...do | | 0 | 25 | 14 | 0 | 24 | 0 | 0 | 30 | 13 | 0 | 16 | 0 |
| Steel | Lauroyl peroxide | 1.0 | 0 | 20 | 5 | 0 | 24 | 0 | 0 | 13 | 11 | 30 | 15 | 15 |
| Do | Cobalt naphthenate | 1.0 | 0 | 20 | 15 | 0 | 29 | 0 | 0 | 13 | 11 | 0 | 16 | 0 |
| Do | Cuprous oxide | 1.0 | 0 | 14 | 12 | 0 | >100 | 0 | 0 | 12 | 21 | 30 | 68 | 0 |
| Do | White lead | 1.0 | | | | | | | 0 | 13 | 14 | 0 | 22 | 0 |

The data show that certain additives affect the melting, stringing and curing time of the polyester of ethylene glycol and the cyclohexadiene dicarboxylic acid. The oxidizing agent lauroyl peroxide reduces the stringing and curing time, cobalt naphthenate has a smaller effect, while the reducing agent cuprous oxide greatly lengthens the curing time. The mixture containing equal proportions of the linear polymers cures in less time on both a non-reducing and reducing surface (glass and steel) than does the polymer comprising the polyester of ethylene glycol and the cyclohexadiene dicarboxylic acid. The curing time of the polymer comprising the mixed esters is less in each case than is that of the polymer derived from the single ester. Here the oxidizing agent reduces the time necessary to effect melting, stringing and curing, while the reducing agent cuprous oxide lengthens the time necessary to effect stringing and curing.

Although the invention has been illustrated by specific examples, it will become apparent to those skilled in the art that various modifications may be made in carrying out the process while retaining the benefit of the discoveries herein disclosed. For instance the specific examples relate to the reaction of ethylene glycol with the trans form of Δ3,5 cyclohexadiene dicarboxylic acid-1,2 in Type I polymer; however the cis form of Δ3,5 cyclohexadiene dicarboxylic acid-1,2 may be used. The Δ3,5 acids are preferred since the Δ2,6 cyclohexadiene dicarboxylic acid-1,2 requires higher reaction temperatures. Furthermore other dibasic alcohols, diamines or amino alcohols as specified as X in the disclosure such as the following may be used:

condensation polymers and any linear compound or polymer containing at least two activated olefinic bonds. For example, alpha unsaturated acyclic dibasic carboxylic acids other than maleic acid such as fumaric, muconic or substituted muconic may be used and the activated olefinic groups may reside in either the dibasic acid portion of the polymer or the activated olefinic groups may reside in the bifunctional alcohol or amine portion of the polymer or the activated olefinic groups may reside in a hydroxy acid or an amino acid linear polymer wherein the polymer is formed by the condensation of like molecules with each other; or the activated olefin groups may be present in a conjugated diene portion of a polymeric product.

The examples disclose properties of the composition obtained in the reaction between the linear polymer Δ3,5 cyclohexadiene dicarboxylic acid-1,2 and ethylene glycol and a second linear polymer of maleic anhydride and ethylene glycol thermoset at temperatures of 100, 125 and 150 degrees centigrade. This composition and the other combinations with the Δ3,5 cyclohexadiene dicarboxylic acid disclosed herein thermoset in a relatively short period of time at temperatures of 70–90° C. However the curing is accelerated as the temperature is increased until at 200° C. the composition sets in less than six minutes. The Δ2,6 cyclohexadiene dicarboxylic acid, in the various combinations of compounds disclosed to form thermoset polymers, requires a somewhat higher temperature and longer time to effect curing than the Δ3,5 cyclohexadiene carboxylic acid and in some instances may require several hours.

Additionally, the invention embraces the reac-

| Name of Compound | Formula of Compound |
|---|---|
| Propylene glycol | $CH_3CHOHCH_2OH$ |
| Butylene glycol | $CH_3CH_2CHOHCH_2OH$ |
| Trimethylene glycol | $CH_2OHCH_2CH_2OH$ |
| Tetramethylene glycol | $CH_2OHCH_2CH_2CH_2OH$ |
| Pentamethylene glycol | $CH_2OHCH_2CH_2CH_2CH_2OH$ |
| Amino ethanol (monoethanolamine) | $CH_2NH_2CH_2OH$ |
| Amino butanol | $CH_2NH_2CH_2CH_2CH_2OH$ |
| Amino octanol | $CH_2NH_2CH_2CH_2CH_2CH_2CH_2CH_2CH_2OH$ |
| Diglycol phthalate | $CH_2OH-CH_2OOCC_6H_4COOCH_2CH_2OH$ |
| Ethylene diamine | $CH_2NH_2CH_2NH_2$ |

Monoglycerides may also be used.

Furthermore in Type II polymers other dibasic alcohols, diamines or amino alcohols as specified by Y earlier in the disclosure and as listed in the examples above may be used.

As previously stated the invention embraces thermosetting mixtures containing Type I linear condensation polymers and any linear compound tion of other proportions of the thermoplastic polymers than shown in the specific examples. Measurable curing effects are obtained, for example, with as little as 1 percent of Type I polymer in Type II maleic acid polyesters or with as little as 1 percent of Type II polyesters in Type I polymer. Furthermore the reactions may be carried out at other temperatures and time periods than those shown for purposes of illustration. Thus the reaction may be carried out at temperatures as low as about 70° C. if time is not of critical importance. Temperatures as high as 200° C. are operative and require very short thermosetting times. For example, curing of mixtures of Type I and Type II polymer may be effected in as little as 0.01 hour at 150° C. Generally temperatures of from about 90 to 150° C. are most desirable, 100–135° C. being preferred. Furthermore, time and temperature necessary to effect curing are decreased by the presence of certain oxidizing agents as previously disclosed.

As those skilled in the art are well aware, the anhydrides of the various dicarboxylic acids may be employed when available equivalently with the acids themselves in esterification reactions such as those by which the Type I and Type II polymers of this invention may be prepared.

I claim:

1. A resinous composition comprising the condensation product of (I) a linear condensation polymer formed by the reaction of (a) a cyclohexadiene dicarboxylic acid having conjugated ethylenic unsaturation and (b) a member of the group consisting of the dihydric alcohols, the diamines and the amino-alcohols and (II) a linear condensation polymer formed by the reaction of (c) an alpha, beta, ethylenically unsaturated aliphatic dicarboxylic acid and (d) a member of the group consisting of the dihydric alcohols, the diamines and the amino-alcohols.

2. A resinous composition comprising the condensation product of (I) a linear polyester formed by the reaction of (a) a cyclohexadiene dicarboxylic acid having conjugated ethylenic unsaturation and (b) a dihydric alcohol and (II) a linear polyester formed by the reaction of (c) an alpha, beta, ethylenically unsaturated aliphatic dicarboxylic acid and (d) a dihydric alcohol.

3. A resinous composition comprising the condensation product of (I) a linear polyester formed by the reaction of (a) Δ3,5-cyclohexadiene dicarboxylic acid-1,2 and (b) a dihydric alcohol and (II) a linear polyester formed by the reaction of (c) an alpha, beta, ethylenically unsaturated aliphatic dicarboxylic acid and (d) a dihydric alcohol.

4. A resinous composition comprising the condensation product of (I) a linear polyester formed by the reaction of (a) Δ2,6-cyclohexadiene dicarboxylic acid-1,2 and (b) a dihydric alcohol and (II) a linear polyester formed by the reaction of (c) an alpha, beta, ethylenically unsaturated aliphatic dicarboxylic acid and (d) a dihydric alcohol.

5. A resinous composition comprising the condensation product of (I) the polyester of Δ3,5-cyclohexadiene dicarboxylic acid-1,2 and ethylene glycol and (II) poly-ethylene-glycol-maleate.

6. A resinous composition comprising the condensation product of (I) a linear condensation polymer having an average of "A" cyclohexadiene radicals in the polymer molecule formed by the reaction of (a) a cyclohexadiene dicarboxylic acid having conjugated ethylenic unsaturation and (b) a member of the group consisting of the dihydric alcohols, the diamines and the amino-alcohols and (II) a linear condensation polymer having an average of "B" ethylenic groups in the polymer molecule and formed by the reaction of (c) an alpha, beta, ethylenically unsaturated aliphatic dicarboxylic acid and (d) a member of the group consisting of the dihydric alcohols, the diamines and the amino-alcohols, the value of "A" and "B" being such that the mathematical product of (A−2) and (B−2) is at least about 10.

7. A resinous composition comprising the condensation product of (I) a linear condensation polymer formed by the reaction of (a) a cyclohexadiene dicarboxylic acid having conjugated ethylenic unsaturation and (b) a member of the group consisting of the dihydric alcohols, the diamines and the amino-alcohols and (II) a linear condensation polymer formed by the reaction of (c) an alpha, beta, ethylenically unsaturated aliphatic dicarboxylic acid and (d) a member of the group consisting of the dihydric alcohols, the diamines and the amino-alcohols, the linear condensation polymer designated by the symbol (I) constituting from about 5% of about 95% of the total weight of the condensation reaction mixture from which the resinous composition is obtained, the linear condensation polymer designated by the symbol (II) constituting the balance of the weight of said condensation reaction mixture.

8. A resinous composition comprising the condensation product of (I) a linear condensation polymer formed by the reaction of (a) a cyclohexadiene dicarboxylic acid having conjugated ethylenic unsaturation and (b) a member of the group consisting of the dihydric alcohols, the diamines and the amino-alcohols and (II) a linear condensation polymer formed by the reaction of (c) an alpha, beta, ethylenically unsaturated aliphatic dicarboxylic acid and (d) a member of the group consisting of the dihydric alcohols, the diamines and the amino-alcohols, the linear condensation polymer designated by the symbol (I) constituting from about 1% to about 99% of the total weight of the condensation reaction mixture from which the resinous composition is obtained, the linear condensation polymer designated by the symbol (II) constituting the balance of the weight of said condensation reaction mixture.

9. A process for the preparation of a resinous composition which comprises condensing at a temperature of from about 90° C. to about 150° C. (I) a linear condensation polymer formed by the reaction of (a) a cyclohexadiene dicarboxylic acid having conjugated ethylenic unsaturation and (b) a member of the group consisting of the dihydric alcohols, the diamines and the amino-alcohols and (II) a linear condensation polymer formed by the reaction of (c) an alpha, beta, ethylenically unsaturated aliphatic dicarboxylic acid and (d) a member of the group consisting of the dihydic alcohols, the diamines and the amino-alcohols.

LUDWIG H. DIMPFL.

REFERENCES CITED

The following references are of record in the file of this patent:

UNITED STATES PATENTS

| Number | Name | Date |
|---|---|---|
| 2,323,706 | D'Alelio | July 6, 1943 |
| 2,403,791 | D'Alelio | July 9, 1946 |